US012425852B2

(12) United States Patent
Vig et al.

(10) Patent No.: US 12,425,852 B2
(45) Date of Patent: Sep. 23, 2025

(54) SUPPORT FOR DIFFERENT RADIO MAC ADDRESSES IN DPP RECONFIGURATION

(71) Applicant: MediaTek Singapore Pte. Ltd., Singapore (SG)

(72) Inventors: Prakhar Vig, Noida (IN); Amit Shakya, Noida (IN); Milankumar Narottmabhai Tandel, Noida (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 164 days.

(21) Appl. No.: 18/137,639

(22) Filed: Apr. 21, 2023

(65) Prior Publication Data

US 2023/0336987 A1    Oct. 19, 2023

(51) Int. Cl.
*H04W 12/06*    (2021.01)
*H04W 24/02*    (2009.01)

(52) U.S. Cl.
CPC .......... *H04W 12/06* (2013.01); *H04W 24/02* (2013.01)

(58) Field of Classification Search
CPC .............................. H04W 12/06; H04W 24/02
USPC ...................... 726/6; 709/223, 224
See application file for complete search history.

(56) References Cited

U.S. PATENT DOCUMENTS

| 11,792,192 | B2 * | 10/2023 | Reimer | H04L 63/0272 |
| | | | | 726/6 |
| 2007/0294456 | A1 * | 12/2007 | Chan | H04L 12/66 |
| | | | | 710/313 |
| 2012/0214494 | A1 * | 8/2012 | Awoniyi | H04W 88/10 |
| | | | | 455/439 |
| 2016/0149901 | A1 * | 5/2016 | Liu | H04W 12/50 |
| | | | | 726/5 |
| 2016/0150412 | A1 * | 5/2016 | Liu | G06F 16/334 |
| | | | | 370/338 |
| 2023/0344715 | A1 * | 10/2023 | Siraj | H04L 63/0876 |
| 2024/0114344 | A1 * | 4/2024 | Shibata | H04W 84/12 |

* cited by examiner

*Primary Examiner* — Liang Che A Wang
(74) *Attorney, Agent, or Firm* — Andy M. Han; Han IP PLLC

(57) ABSTRACT

Various schemes pertaining to support for different radio medium access control (MAC) addresses in Device Provisioning Protocol (DPP) reconfiguration in DPP networks are described. An apparatus performs a reconfiguration process between an enrollee agent and a controller of a DPP network without a reconfiguration authentication response timeout occurring in the controller. Each of the enrollee agent and the controller operates in at least two wireless bands. The enrollee agent is configured with at least two communication interfaces each with a different medium access control (MAC) address corresponding to a respective one of the at least two wireless bands.

2 Claims, 7 Drawing Sheets

600

PERFORM, BY A PROCESSOR OF AN APPARATUS, A RECONFIGURATION PROCESS BETWEEN AN ENROLLEE AGENT AND A CONTROLLER OF A DEVICE PROVISIONING PROTOCOL (DPP) NETWORK WITHOUT A RECONFIGURATION AUTHENTICATION RESPONSE TIMEOUT OCCURRING IN THE CONTROLLER

- EACH OF THE ENROLLEE AGENT AND THE CONTROLLER OPERATES IN AT LEAST TWO WIRELESS BANDS
- THE ENROLLEE AGENT IS CONFIGURED WITH AT LEAST TWO COMMUNICATION INTERFACES EACH WITH A DIFFERENT MEDIUM ACCESS CONTROL (MAC) ADDRESS CORRESPONDING TO A RESPECTIVE ONE OF THE AT LEAST TWO WIRELESS BANDS

SUPPORT FOR DIFFERENT RADIO MAC ADDRESSES IN DPP RECONFIGURATION

CROSS REFERENCE TO RELATED PATENT APPLICATION(S)

The present disclosure claims the priority benefit of India Patent Application Nos. 202221022777 and 202221033111, filed 18 Apr. 2022 and 9 Jun. 2022, respectively, the contents of which being incorporated by reference in their entirety.

TECHNICAL FIELD

The present disclosure is generally related to computer networking and, more particularly, to support for different radio medium access control (MAC) addresses in Device Provisioning Protocol (DPP) reconfiguration in DPP networks.

BACKGROUND

Unless otherwise indicated herein, approaches described in this section are not prior art to the claims listed below and are not admitted to be prior art by inclusion in this section.

In a Wi-Fi network, such as a DPP network implementing one or more of Institute of Electrical and Electronics Engineers (IEEE) 802.11 standards, there may be a multi-access point (MAP) DPP reconfiguration announcement problem with different source MAC addresses for different radios and/or interfaces. As per DPP R2 Specification, a station (STA), as an enrollee, typically follows certain steps to send a reconfiguration announcement. Firstly, the enrollee selects a preferred channel on which to send a DPP Reconfiguration Presence Announcement frame to a broadcast address. The preferred channel is one of the following channels: Channel 6 (2.437 GHz) in a 2.4 GHZ band, Channel 44 (5.220 GHz) in a 5 GHz band in case that local regulations permit operation only in the 5.150-5.250 GHz band and Channel 149 (5.745 GHz) otherwise, Channel 2 (60.48 GHz) in a 60 GHz band, and any other channel added to a channel list. Next, the enrollee scans all supported bands and adds each channel on which an access point (AP) is advertising the Configurator Connectivity information element (IE) to the channel list. Moreover, the enrollee removes any duplicate channels.

Once the channel list has been derived based on aforementioned steps, the enrollee selects a channel from the channel list, sends a DPP reconfiguration announcement frame, and waits for two seconds for a DPP Reconfiguration Authentication Request frame. In case that a valid DPP Reconfiguration Authentication Request frame is not received, the enrollee repeats this procedure for the next channel on the channel list. When all channels on the channel list have been exhausted, the enrollee pauses for at least 30 seconds before repeating the DPP Reconfiguration Announcement procedure.

However, devices, APs and non-AP STAs alike, can have different MAC addresses for different radio interfaces (e.g., the MAC address of a 2.4 GHZ radio interface being different from the MAC address of a 5 GHz radio). When Reconfiguration is triggered, the enrollee sends the reconfiguration announcement. When a proxy agent receives the reconfiguration announcement on its channel, it forwards the reconfiguration announcement to a controller. The controller, upon receiving the reconfiguration announcement, maintains data structure based on enrollee's MAC address, as the reconfiguration announcement received has the enrollee's MAC address. Next, the controller sends a Reconfiguration Authentication Request to the proxy agent, which in turn stores the Reconfiguration Authentication Request and forwards to the enrollee on listening for a new reconfiguration announcement from the same source MAC address as received previously per MAP R3 specification. The enrollee sends a second reconfiguration announcement with the same source MAC address only after a minimum of 30-second delay as per DPP R2 Specification and the enrollee would increase the delay in case the number of channels in a reconfiguration chirping channel list is more. As per the DPP R2 Specification, after sending a reconfiguration announcement on a channel, the enrollee needs to wait for 2 seconds and, once all channels on the channel list are completed, the enrollee needs to wait for 30 seconds before starting the next round of reconfiguration announcement. Due to the delay in sending the second reconfiguration announcement, timeout regarding reconfiguration authentication response occurs in the controller, as DPP R2 Specification specifies that Reconfiguration Authentication Response timeout is 5 seconds.

As such, an issue in connection during Reconfiguration could result. Another issue pertains to multiple entries created in or by the controller for the same device with different source MAC addresses (e.g., one entry created when a reconfiguration announcement is sent by the enrollee on a 2.4 GHz radio and another entry created when another reconfiguration announcement is sent by the enrollee on a 5 GHz radio as they have different MAC addresses). Therefore, there is a need for a solution of support for different radio MAC addresses in DPP reconfiguration in DPP networks.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose novel schemes pertaining to support for different radio MAC addresses in DPP reconfiguration in DPP networks. It is believed that implementation of various proposed schemes of the present disclosure may reduce or otherwise minimize the time spent in connection, roaming and steering in DPP networks.

In one aspect, a method may involve a processor of an apparatus performing a reconfiguration process between an enrollee agent and a controller of a DPP network without a reconfiguration authentication response timeout occurring in the controller. Each of the enrollee agent and the controller may operate in at least two wireless bands. The enrollee agent may be configured with at least two communication interfaces each with a different MAC address corresponding to a respective one of the at least two wireless bands.

In another aspect, an apparatus may include a transceiver and a processor. The transceiver may be configured to communicate wirelessly. The processor may perform, via the transceiver, a reconfiguration process between an enrollee agent and a controller of a DPP network without a reconfiguration authentication response timeout occurring in the controller. Each of the enrollee agent and the controller may operate in at least two wireless bands. The enrollee agent may be configured with at least two communication interfaces each with a different MAC address corresponding to a respective one of the at least two wireless bands.

It is noteworthy that, although description provided herein may be in the context of certain radio access technologies, networks and network topologies such as Wi-Fi and DPP networks, the proposed concepts, schemes and any variation(s)/derivative(s) thereof may be implemented in, for and by other types of radio access technologies, networks and network topologies such as, for example and without limitation, repeater networks, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 6 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to support for different radio MAC addresses in DPP reconfiguration in DPP networks. According to the present disclosure, a number of possible solutions may be implemented separately or jointly. That is, although these possible solutions may be described below separately, two or more of these possible solutions may be implemented in one combination or another.

Figure 1:
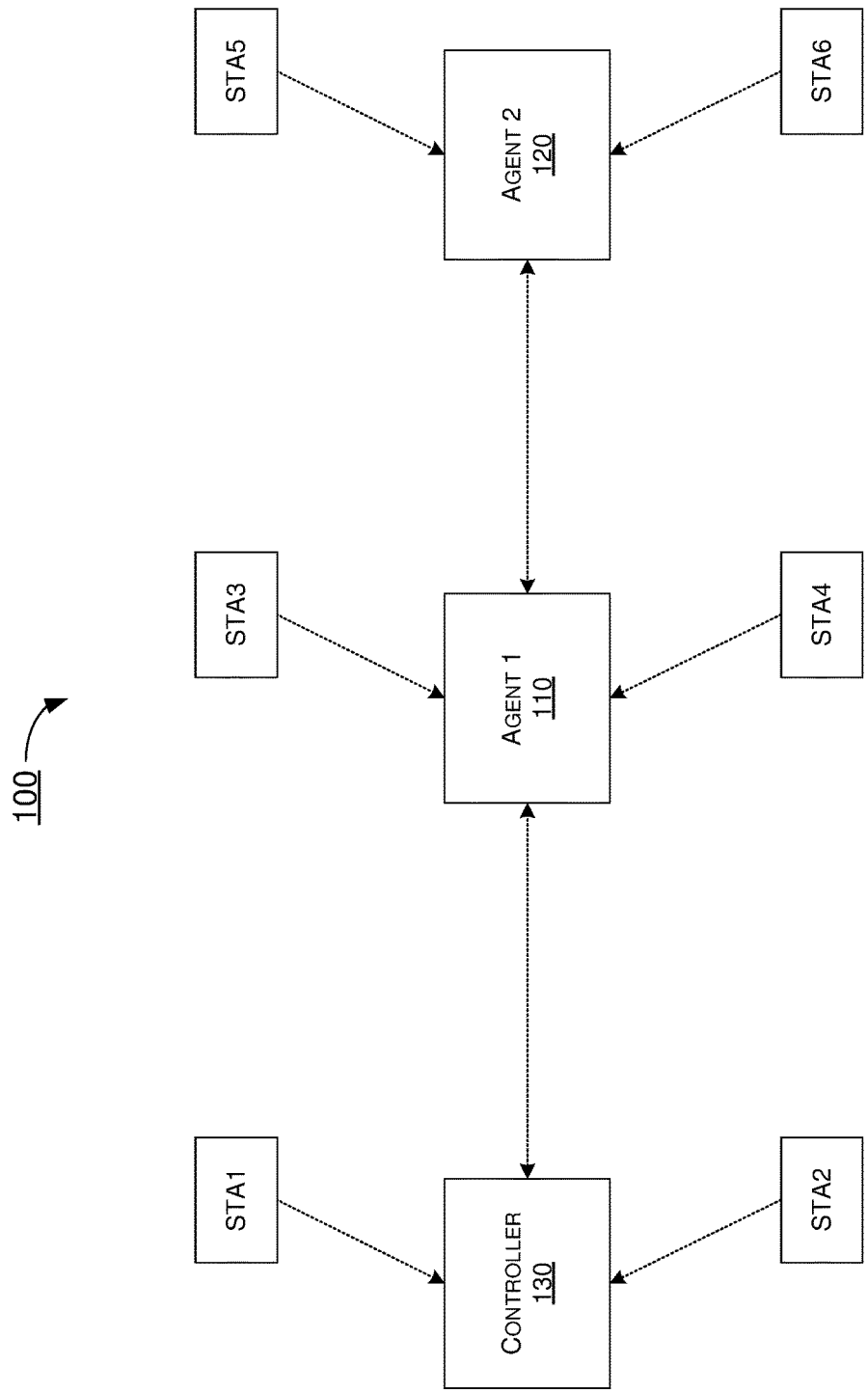
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6.

Referring to FIG. 1, network environment 100 may involve a wireless network (e.g., a mesh network such as a DPP network) having a controller 130, a plurality of agents, and a plurality of STAs. For illustrative purposes and simplicity, two agents such as agent 110 (herein interchangeably referred to as "agent 1") and agent 120 (herein interchangeably referred to as "agent 2"). Each of controller 130, agent 110 and agent 120 may be in communication with one or more associated STAs (e.g., STA1 and STA2 associated with controller 130, STA3 and STA4 associated with agent 110, and STA5 and STA6 associated with agent 120) are shown in FIG. 1, although different numbers of agents and STAs may be present in various implementations. Under various proposed schemes in accordance with the present disclosure, each of controller 130, agent 110, agent 120 and the plurality of STAs may be configured to perform respective aspects of support for different radio MAC addresses in DPP reconfiguration in DPP networks in accordance with various proposed schemes described below. For instance, agent 120 may function as an enrollee and agent 110 may function as a proxy agent under various proposed schemes of the present disclosure. Moreover, each of agent 110, agent 120 and controller 130 may be capable of multi-band operation (e.g., dual-band operation) in multiple bands such as, for example and without limitation, 2 GHz and 5 GHz bands. It is noteworthy that, although various proposed schemes in accordance with the present disclosure may be individually described below, in actual implementations some or all of the proposed schemes may be implemented jointly or individually.

Under various proposed schemes in accordance with the present disclosure, a MAP network operates on fixed channel(s) and all devices support such channel(s). There are mainly three device roles in a MAP-R3 network, namely: controller, agent and proxy agent. In the present disclosure, the term "controller" may refer to a centralized entity which controls devices, which may include agents, present in a mesh network (e.g., DPP network). The term "agent" may refer to an entity, which is a part of a network controlled by the a controller, that supports AP and/or STA functionality. The term "reconfiguration announcement" may refer to a DPP action frame sent by an enrollee agent to the controller or an existing agent (e.g., the enrollee sends a DPP reconfiguration announcement frame in order to request for reconfiguration). The term "CCE" may refer to a control channel element (CCE) IE added in a beacon response or probe response as a part to identify the controller and/or agent(s) supporting Easyconnect-R2.

Under the various proposed schemes in accordance with the present disclosure, the controller is the central device which is able to configure other devices using DPP configuration protocol, and the controller controls the complete network. The controller broadcasts CCE IE in its beacon and/or probe response to make its presence known to other agent devices in the network. The DPP R2 message flow in forming a DPP connection is as follows: authentication-→configuration→network introduction. The agent is a device which joins the network through DPP connection to the controller, and the agent is herein interchangeably referred to as an enrollee. When the enrollee/agent intends to receive updated configuration, it triggers reconfiguration using the reconfiguration announcement. The proxy agent is a device which was previously MAP R3 onboarded to the network using the controller or an oath agent. Upon onboarding or upon receiving a DPP uniform resource identifier (URI), the controller indicates to proxy agent to enable CCE IE in its beacon and/or probe response. In case that the controller is not reachable directly to a new agent or in case that the controller does not handle DPP action frames directly, an existing agent may act as a proxy agent to forward messages from an enrollee agent to the controller through Proxied or Direct encapsulated 1905 messages.

Under a first proposed scheme in accordance with the present disclosure, a duration of a timer used in reconfiguration authentication response timeout in the controller may be increased. Under the proposed scheme, a maximum number of channels on each band (or a sum of all channels on the multiple bands) may be multiplied by 2-second waiting time on each channel of multiple channels corresponding to the multiple bands. For example, for a device supporting both the 2.4 GHz band and 5 GHz band, total timeout=(all 2.4 GHz channels+all 5 GHz channels)*2 seconds.

Figure 2:
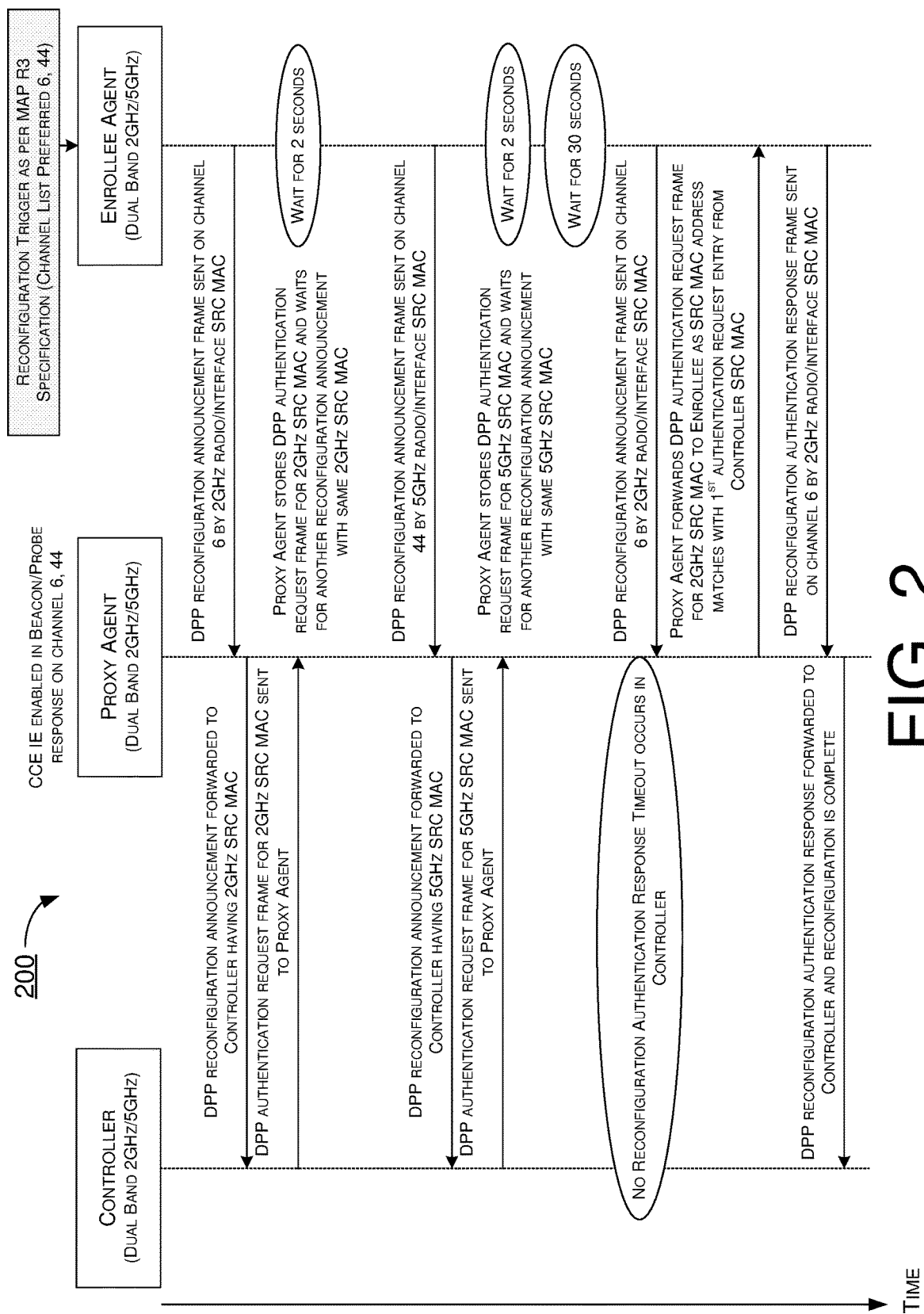
FIG. 2 is a diagram of an example scenario in accordance with the present disclosure.

FIG. 2 illustrates an example scenario 200 under the first proposed scheme. Scenario 200 is an illustration of a success case in implementing the first proposed scheme described above. Scenario 200 involves an enrollee agent (e.g., agent 120), a proxy agent (e.g., agent 110) and a controller (e.g., controller 130) in a network environment (e.g., network environment 100), and each of the enrollee agent, proxy agent and controller operates in the dual bands of 2 GHz and 5 GHz (although in actual implementations there may be more bands or different bands). In scenario 200, the controller broadcasts CCE IE in its beacon and/or probe response on, for example and without limitation, channels 6 and 44 to make its presence known to other agent devices in the network. Upon receiving or otherwise determining a reconfiguration trigger (e.g., as per MAP R3 Specification) with a channel list prepared and having channels 6 and 44 on the list, the enrollee agent transmits a DPP reconfiguration announcement frame on channel 6 with the source MAC address being that of its 2 GHz radio or communication interface. Upon receipt, the proxy agent forwards this (first) DPP reconfiguration announcement frame to the controller. In response, the controller transmits to the proxy agent a DPP authentication request frame for the 2 GHz source MAC address. The proxy agent stores the DPP authentication request frame for the 2 GHz source MAC address and waits for another reconfiguration announcement with the same 2 GHz source MAC address. Meanwhile, the enrollee agent waits for 2 seconds and then sends a DPP reconfiguration announcement frame on channel 44 with the source MAC address being that of its 5 GHz radio or communication interface. Upon receipt, the proxy agent forwards this (second) DPP reconfiguration announcement frame to the controller. In response, the controller transmits to the proxy agent a DPP authentication request frame for the 5 GHz source MAC address. Meanwhile, the enrollee agent waits for 2 seconds. The proxy agent stores the DPP authentication request frame for the 5 GHz source MAC address and waits for another reconfiguration announcement with the same 5 GHz source MAC address. Under the first proposed scheme, no reconfiguration authentication response timeout occurs in the controller as a duration of a timer used in the timeout is increased (e.g., total timeout=(all 2 GHz channels+all 5 GHz channels)*2 seconds) compared to a conventional timer without implementing this proposed scheme. After waiting for another 30 seconds, the enrollee agent transmits a DPP reconfiguration announcement frame on channel 6 with the source MAC address being that of its 2 GHz radio or communication interface. Upon receipt, the proxy agent forwards the DPP authentication request frame for the 2 GHz source MAC address to the enrollee device, as the source MAC address matches that corresponding to the first DPP authentication request entry from the controller. In response, the enrollee agent transmits a DPP reconfiguration authentication response frame on channel 6 with the source MAC address being that of its 2 GHz radio or communication interface, which is forwarded by the proxy agent to the controller to complete the DPP reconfiguration process.

Under a second proposed scheme in accordance with the present disclosure, a proxy agent may send a reconfiguration authentication request (in response to a first reconfiguration announcement) without waiting for a second reconfiguration announcement. This is because there is a chance that an enrollee may be waiting on the same channel, either due to the reconfiguration authentication request being received from the controller in less than 2 seconds or due to the enrollee still waiting on this channel. It is believed that this proposed scheme may improve (e.g., decrease) connection time and, in cases in which the enrollee waits for the reconfiguration authentication request, the connection may be formed immediately.

Under the proposed scheme, the enrollee may first scan for CCE IE to produce a channel list as described above. Once the channel list is prepared, the enrollee may select a first channel for attempting transmission of reconfiguration announcement(s) as a channel on which the reconfiguration was triggered (e.g., a current backhaul channel on which the reconfiguration was triggered due to connection failure or any other reason). Next, the enrollee may send a reconfiguration announcement on the selected channel and may keep waiting on this channel for a long time before moving to another channel to repeat this procedure. During the waiting period, a proxy agent receiving the reconfiguration authentication request may forward it to the enrollee, which may acknowledge the receipt to the proxy agent. Consequently, a reconfiguration procedure may start on this channel.

Figure 3:
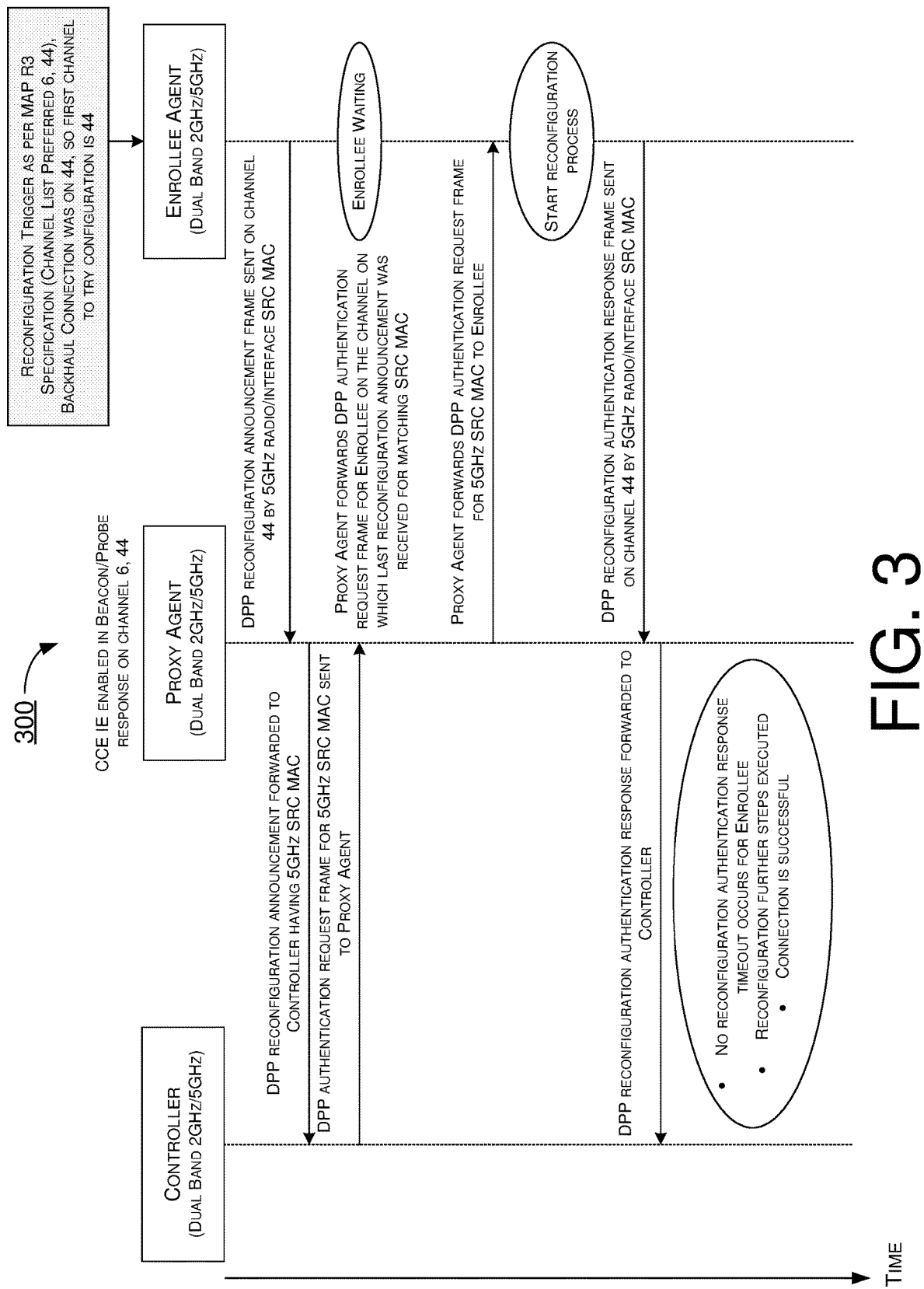
FIG. 3 is a diagram of an example scenario in accordance with the present disclosure.

FIG. 3 illustrates an example scenario 300 under the second proposed scheme. Scenario 300 is an illustration of a success case in implementing the second proposed scheme described above. Scenario 300 involves an enrollee agent (e.g., agent 120), a proxy agent (e.g., agent 110) and a controller (e.g., controller 130) in a network environment (e.g., network environment 100), and each of the enrollee agent, proxy agent and controller operates in the dual bands of 2 GHz and 5 GHz (although in actual implementations there may be more bands or different bands). In scenario 300, the controller broadcasts CCE IE in its beacon and/or probe response on, for example and without limitation, channels 6 and 44 to make its presence known to other agent devices in the network. For the enrollee agent, as backhaul connection was on channel 44, the first channel in which reconfiguration is attempted is thus channel 44. Upon receiving or otherwise determining a reconfiguration trigger (e.g., as per MAP R3 Specification) with a channel list prepared and having channels 6 and 44 on the list, the enrollee agent transmits a DPP reconfiguration announcement frame on channel 44 with the source MAC address being that of its 5 GHz radio or communication interface. Upon receipt, the proxy agent forwards this (first) DPP reconfiguration announcement frame to the controller. In response, the controller transmits to the proxy agent a DPP authentication request frame for the 5 GHz source MAC address. Meanwhile, the enrollee agent awaits for a response. Under the second proposed scheme, the proxy agent forwards the DPP authentication request frame to the enrollee agent on the channel on which the last reconfiguration announcement was received (e.g., channel 44 in this case) for matching source MAC address. Thus, the proxy agent forwards the DPP authentication request frame for the 5 GHz source MAC address to the enrollee agent. In response, the enrollee agent starts a DPP reconfiguration process and transmits a DPP reconfiguration authentication response frame on channel 44 with the source MAC address being that of its 5 GHz radio or communication interface. Upon receipt, the proxy agent forwards the DPP reconfiguration authentication response to the controller. Advantageously, no reconfiguration authentication response timeout occurs in the controller and, thus, any further steps of the DPP reconfiguration process are executed to result in a successful connection.

Under a third proposed scheme in accordance with the present disclosure, in an event that the enrollee does not wait for a long time on the same channel or in case that the reconfiguration authentication request is not received by the proxy agent in 2 seconds, the enrollee may send multiple reconfiguration announcements on the same channel before moving to another channel. This may allow the proxy agent to send a reconfiguration authentication request, thereby resulting in reconfiguration procedure to be completed immediately.

Under the proposed scheme, the enrollee may first scan for CCE IE to produce a channel list as described above. Once the channel list is prepared, the enrollee may select a first channel for attempting transmission of reconfiguration announcement(s) as a channel on which the reconfiguration was triggered (e.g., a current backhaul channel on which the reconfiguration was triggered due to connection failure or any other reason). Next, the enrollee may attempt, on a selected channel from the channel list, multiple times (e.g., 3 times) every certain seconds (e.g., every 2 seconds), and the enrollee may repeat this process for all channels on the channel list. After all channels have been tried once, the enrollee may wait for a predefined period (e.g., 30 seconds) and repeat the attempt again (on the channels on the channel list).

Figure 4:
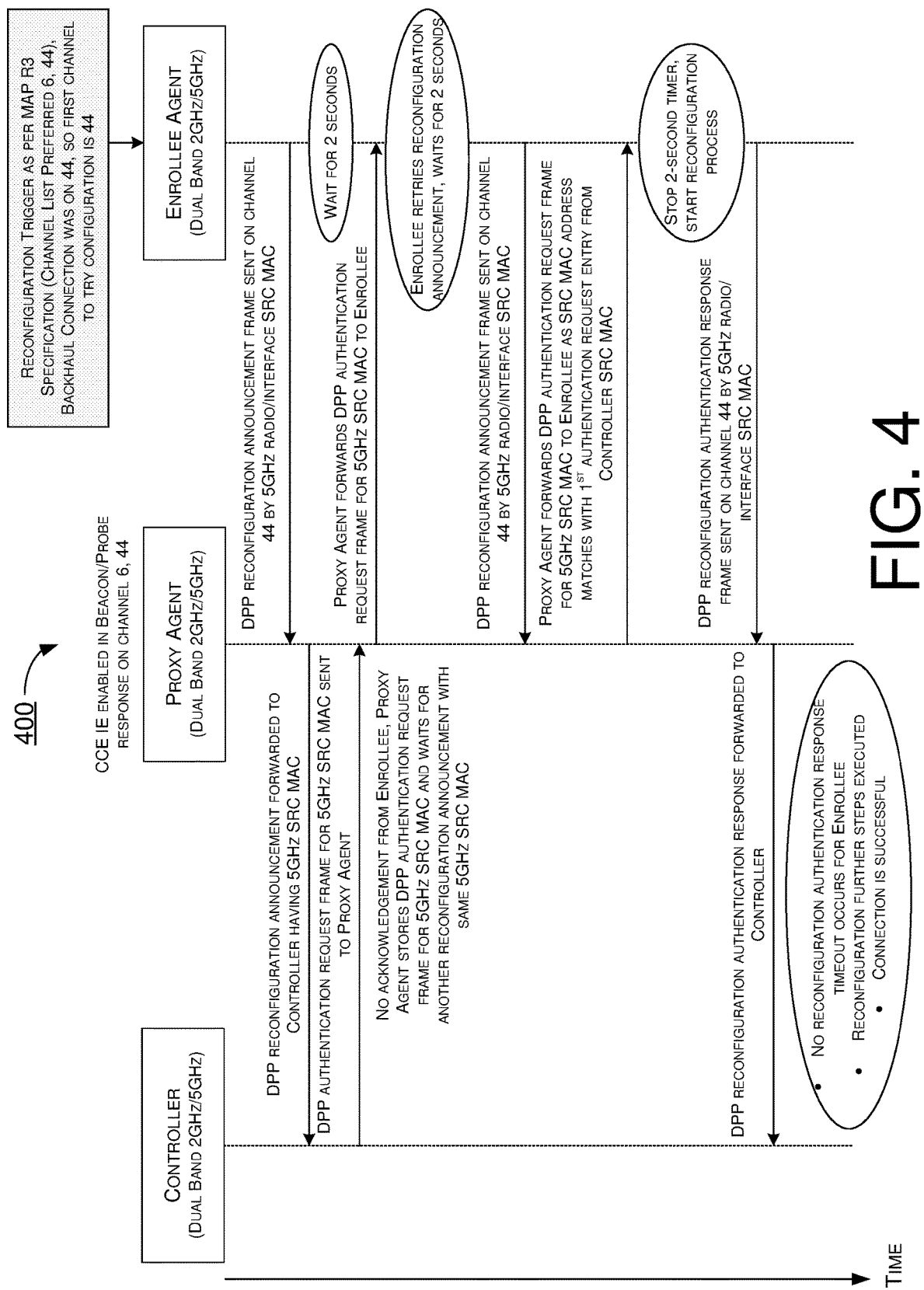
FIG. 4 is a diagram of an example scenario in accordance with the present disclosure.

FIG. 4 illustrates an example scenario 300 under the third proposed scheme. Scenario 400 is an illustration of a success case in implementing the third proposed scheme described above. Scenario 400 involves an enrollee agent (e.g., agent 120), a proxy agent (e.g., agent 110) and a controller (e.g., controller 130) in a network environment (e.g., network environment 100), and each of the enrollee agent, proxy agent and controller operates in the dual bands of 2 GHz and 5 GHz (although in actual implementations there may be more bands or different bands). In scenario 400, the controller broadcasts CCE IE in its beacon and/or probe response on, for example and without limitation, channels 6 and 44 to make its presence known to other agent devices in the network. For the enrollee agent, as backhaul connection was on channel 44, the first channel in which reconfiguration is attempted is thus channel 44. Upon receiving or otherwise determining a reconfiguration trigger (e.g., as per MAP R3 Specification) with a channel list prepared and having channels 6 and 44 on the list, the enrollee agent transmits a first DPP reconfiguration announcement frame on channel 44 with the source MAC address being that of its 5 GHz radio or communication interface. Upon receipt, the proxy agent forwards this first DPP reconfiguration announcement frame to the controller. In response, the controller transmits to the proxy agent a first DPP authentication request frame for the 5 GHz source MAC address. Meanwhile, the enrollee agent waits for 2 seconds. Upon receipt, the proxy agents forwards the first DPP authentication request frame for the 5 GHz source MAC address to the enrollee agent, and the enrollee times out in waiting for authentication request frame. Under the third proposed scheme, the enrollee device retries reconfiguration announcement and waits for 2 seconds. Then, the enrollee agent transmits a second DPP reconfiguration announcement frame on channel 44 with the source MAC address being that of its 5 GHz radio or communication interface. Upon receipt, the proxy agent transmits the DPP authentication request frame for the 5 GHz source MAC address to the enrollee agent due to a match with the source MAC address for which the controller sent the first DPP authentication request frame. Upon receipt, the enrollee agent stops its 2-second timer and starts a DPP reconfiguration process. Moreover, the enrollee agent transmits a DPP reconfiguration authentication response frame on channel 44 with the source MAC address being that of its 5 GHz radio or communication interface. Upon receipt, the proxy agent forwards the DPP reconfiguration authentication response to the controller. Advantageously, no reconfiguration authentication response timeout occurs in the controller and, thus, any further steps of the DPP reconfiguration process are executed to result in a successful connection.

In view of the above, it is believed that the various proposed schemes help address or otherwise alleviate the issues pertaining to different MAC addresses for different radios in MAP R3/DPP R2 reconfiguration. Specifically, it is believed that the various proposed schemes address the issues in different ways. That is, the first proposed scheme may increase a duration of the reconfiguration authentication response timeout in the controller. Under the second proposed scheme, a proxy agent may send/forward a reconfiguration authentication request as soon as the proxy agent receives it from a controller, assuming the enrollee is waiting on a current channel on which a reconfiguration announcement is sent by the enrollee or the reconfiguration authentication request is received by the enrollee in less than 2 seconds. Under the third proposed scheme, in case that the enrollee still does not receive a response, the enrollee may send multiple reconfiguration announcements on the same channel before moving to another channel so that the proxy anent may send a reconfiguration authentication request to complete the reconfiguration procedure immediately.

Figure 7:
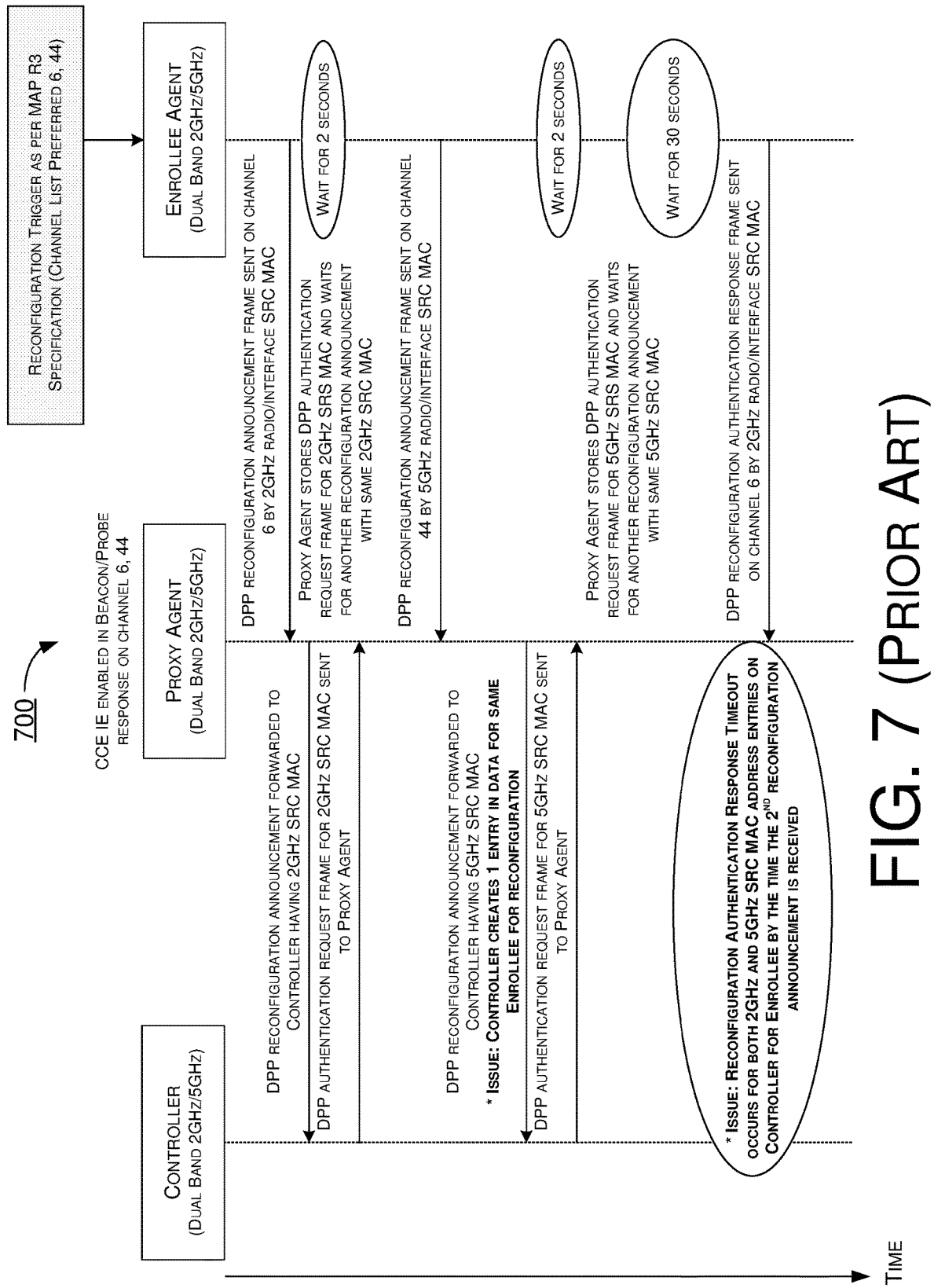
FIG. 7 is a diagram of an example scenario in which failures occur in DPP reconfiguration.

FIG. 7 illustrates an example scenario 700 in which failures occur in DPP reconfiguration without implementing any of the various proposed schemes described herein. Scenario 700 is an illustration of a failure case involving an enrollee agent (e.g., agent 120), a proxy agent (e.g., agent 110) and a controller (e.g., controller 130) in a network environment (e.g., network environment 100), and each of the enrollee agent, proxy agent and controller operates in the dual bands of 2 GHz and 5 GHz (although in actual implementations there may be more bands or different bands). In scenario 700, the controller broadcasts CCE IE in its beacon and/or probe response on, for example and without limitation, channels 6 and 44 to make its presence known to other agent devices in the network. Upon receiving or otherwise determining a reconfiguration trigger (e.g., as per MAP R3 Specification) with a channel list prepared and having channels 6 and 44 on the list, the enrollee agent transmits a first DPP reconfiguration announcement frame on channel 6 with the source MAC address being that of its 2 GHz radio or communication interface. Upon receipt, the proxy agent forwards this (first) DPP reconfiguration announcement frame to the controller. In response, the controller transmits to the proxy agent a DPP authentication request frame for the 2 GHz source MAC address. The proxy agent stores the DPP authentication request frame for the 2 GHz source MAC address and waits for another reconfiguration announcement with the same 2 GHz source MAC address. Meanwhile, the enrollee agent waits for 2 seconds and then sends a first DPP reconfiguration announcement frame on channel 44 with the source MAC address being that of its 5 GHz radio or communication interface. Upon receipt, the proxy agent forwards this (second) DPP reconfiguration announcement frame to the controller. However, an issue arises as the controller creates one more entry (or two entries total) in its data for the same enrollee for reconfiguration since the two DPP reconfiguration announcement it has received thus far are associated with two different source MAC addresses. In response, the controller transmits to the proxy agent a DPP authentication request frame for the 5 GHz source MAC address. Meanwhile, the enrollee agent waits for 2 seconds. The proxy agent stores the DPP authentication request frame for the 5 GHz source MAC address and waits for another reconfiguration announcement with the same 3 GHz source MAC address. The enrollee waits for another 30 seconds and then transmits a second DPP reconfiguration announcement frame on channel 6 with the source MAC address being that of its 2 GHz radio or communication interface. However, another issue arises as reconfiguration authentication response timeout occurs in the controller for both entries for the 2 GHz and 3 GHz source MAC addresses for the enrollee agent before the second DPP reconfiguration announcement is received by the controller.

Illustrative Implementations

Figure 5:
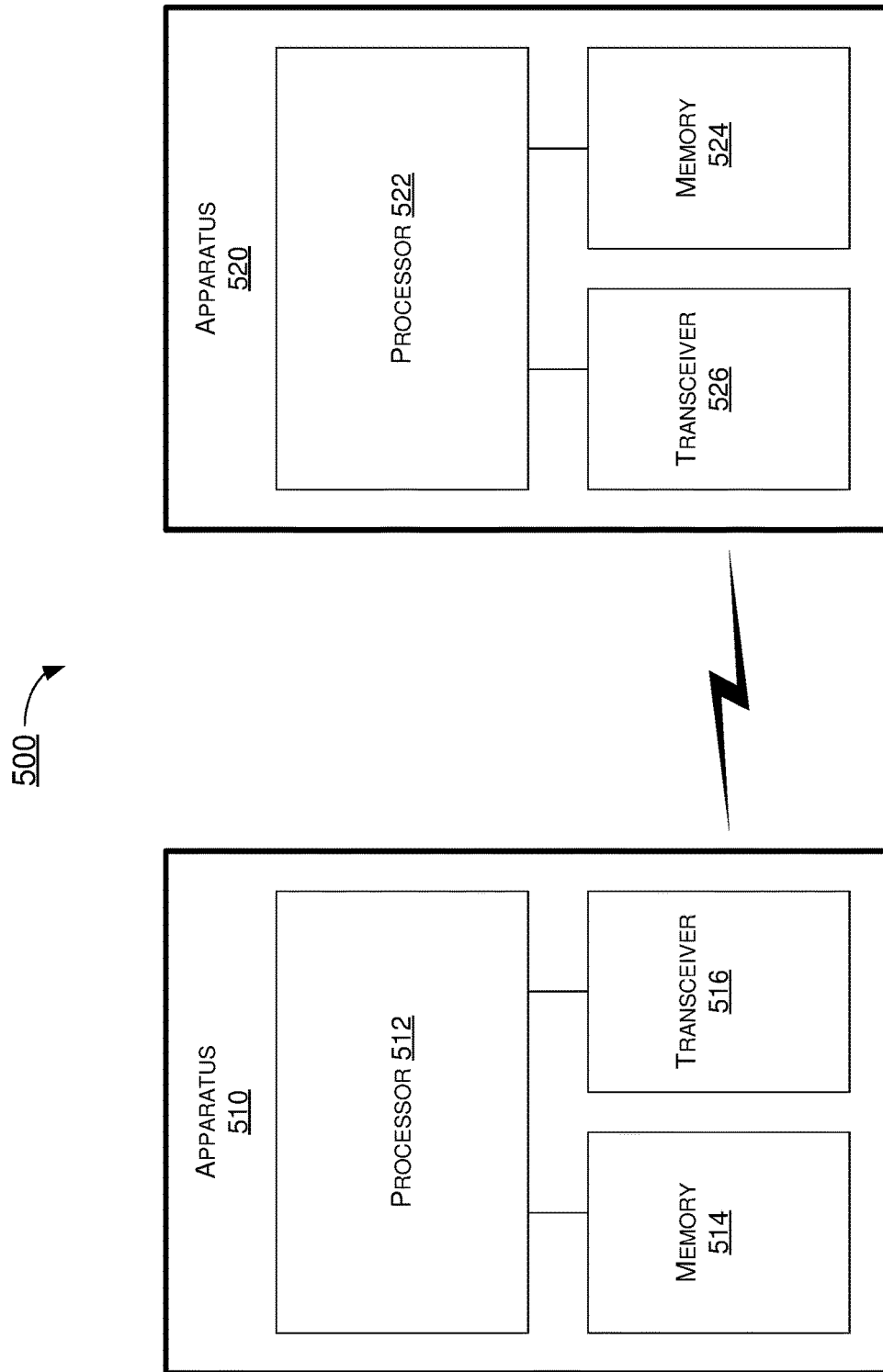
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to support for different radio MAC addresses in DPP reconfiguration in DPP networks, including the various schemes described above with respect to various proposed designs, concepts, schemes, systems and methods described above as well as processes described below. For instance, apparatus 510 may be implemented in one of agent 110, agent 120 and controller 130, and apparatus 520 may be implemented in another one of agent 110, agent 120 and controller 130.

Each of apparatus 510 and apparatus 520 may be a part of an electronic apparatus, which may be a non-AP STA or an AP STA, such as a portable or mobile apparatus, a wearable apparatus, a wireless communication apparatus or a computing apparatus. When implemented in a non-AP STA, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a non-AP STA or an AP STA. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to support for different radio MAC addresses in DPP reconfiguration in DPP networks in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM)

and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (FeRAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510 and apparatus 520 is provided below in the context of apparatus 510 implemented in or as an agent (e.g., agent 110 or agent 120) and apparatus 520 implemented in or as another agent or a controller (e.g., controller 130) of a DPP network such as a WLAN in network environment 100 in accordance with one or more of IEEE 802.11 standards. It is noteworthy that, although the example implementations described below are provided in the context of WLAN, the same may be implemented in other types of networks.

Under a proposed scheme pertaining to support for different radio MAC addresses in DPP reconfiguration in DPP networks in accordance with the present disclosure, processor 512 of apparatus 510 may perform, via transceiver 516, a reconfiguration process between an enrollee agent and a controller of a DPP network without a reconfiguration authentication response timeout occurring in the controller. Each of the enrollee agent and the controller may operate in at least two wireless bands. The enrollee agent may be configured with at least two communication interfaces each with a different MAC address corresponding to a respective one of the at least two wireless bands.

In some implementations, the apparatus may be implemented in the controller. In such cases, in performing the reconfiguration process, processor 512 may perform the reconfiguration process with an increased duration of reconfiguration authentication response timeout in the controller. In some implementations, the duration of reconfiguration authentication response timeout may be increased to an amount equal to a maximum number of channels on each band of the at least two wireless bands multiplied by a waiting time on each channel of at least two channels corresponding to the at least two wireless bands.

In some implementations, the apparatus may be implemented in a proxy agent in the DPP network which forwards frames between the enrollee agent and the controller. In such cases, in performing the reconfiguration process, processor 512 may, without waiting to receive a second DPP reconfiguration announcement frame from the enrollee agent, forward to the enrollee agent a first DPP authentication request frame received from the controller on a channel on which a first DPP reconfiguration announcement frame was received from the enrollee agent and forwarded to the controller. In some implementations, the first DPP reconfiguration announcement frame and the first DPP authentication request frame may have a matching source MAC address. In some implementations, the first DPP reconfiguration announcement frame may be received from the enrollee agent on a first channel in a first band of the at least two wireless bands, and the first DPP authentication request frame may be received from the controller on the first channel in the first band of the at least two wireless bands.

In some implementations, the first channel may be a current backhaul channel on which reconfiguration was triggered.

In some implementations, the apparatus may be implemented in the enrollee agent. In such cases, in performing the reconfiguration process, processor 512 may transmit at least twice a DPP reconfiguration announcement frame on each channel before moving to another channel of a plurality of channels. In some implementations, processor 512 may further receive a respective forwarding of a DPP authentication request frame from a proxy agent of the DPP network responsive to each transmission of the DPP reconfiguration announcement frame. Moreover, processor 512 may complete the reconfiguration process upon receiving the DPP authentication request frame twice from the proxy agent. In some implementations, the DPP reconfiguration announcement frame may be transmitted on a first channel in a first band of the at least two wireless bands, and the DPP authentication request frame may be received on the first channel in the first band of the at least two wireless bands. In some implementations, the first channel may be a current backhaul channel on which reconfiguration was triggered.

Illustrative Processes

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to support for different radio MAC addresses in DPP reconfiguration in DPP networks in accordance with the present disclosure. Process 600 may include one or more operations, actions, or functions as illustrated by block 610. Although illustrated as discrete blocks, block 610 of process 600 may be divided into additional blocks, and sub-blocks of process 600 may be combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 implemented in or as an agent (e.g., agent 110 or agent 120) or a controller with apparatus 520 implemented in or as another agent (e.g., agent 110 or agent 120) or the controller (e.g., controller 130) of a DPP network such as a WLAN in network environment 100 in accordance with one or more of IEEE 802.11 standards. Process 600 may begin at block 610.

At 610, process 600 may involve processor 512 of apparatus 510 performing, via transceiver 516, a reconfiguration process between an enrollee agent and a controller of a DPP network without a reconfiguration authentication response timeout occurring in the controller. Each of the enrollee agent and the controller may operate in at least two wireless bands. The enrollee agent may be configured with at least two communication interfaces each with a different MAC address corresponding to a respective one of the at least two wireless bands.

In some implementations, the apparatus may be implemented in the controller. In such cases, in performing the reconfiguration process, process 600 may involve processor 512 performing the reconfiguration process with an increased duration of reconfiguration authentication response timeout in the controller. In some implementations, the duration of reconfiguration authentication response timeout may be increased to an amount equal to a maximum number of channels on each band of the at least two wireless bands multiplied by a waiting time on each channel of at least two channels corresponding to the at least two wireless bands.

In some implementations, the apparatus may be implemented in a proxy agent in the DPP network which forwards frames between the enrollee agent and the controller. In such cases, in performing the reconfiguration process, process 600 may involve processor 512, without waiting to receive a second DPP reconfiguration announcement frame from the enrollee agent, forwarding to the enrollee agent a first DPP authentication request frame received from the controller on a channel on which a first DPP reconfiguration announcement frame was received from the enrollee agent and forwarded to the controller. In some implementations, the first DPP reconfiguration announcement frame and the first DPP authentication request frame may have a matching source MAC address. In some implementations, the first DPP reconfiguration announcement frame may be received from the enrollee agent on a first channel in a first band of the at least two wireless bands, and the first DPP authentication request frame may be received from the controller on the first channel in the first band of the at least two wireless bands. In some implementations, the first channel may be a current backhaul channel on which reconfiguration was triggered.

In some implementations, the apparatus may be implemented in the enrollee agent. In such cases, in performing the reconfiguration process, process 600 may involve processor 512 transmitting at least twice a DPP reconfiguration announcement frame on each channel before moving to another channel of a plurality of channels. In some implementations, process 600 may further involve processor 512 receiving a respective forwarding of a DPP authentication request frame from a proxy agent of the DPP network responsive to each transmission of the DPP reconfiguration announcement frame. Moreover, process 600 may involve processor 512 completing the reconfiguration process upon receiving the DPP authentication request frame twice from the proxy agent. In some implementations, the DPP reconfiguration announcement frame may be transmitted on a first channel in a first band of the at least two wireless bands, and the DPP authentication request frame may be received on the first channel in the first band of the at least two wireless bands. In some implementations, the first channel may be a current backhaul channel on which reconfiguration was triggered.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   performing, by a processor of an apparatus, a reconfiguration process between an enrollee agent and a controller of a Device Provisioning Protocol (DPP) network without a reconfiguration authentication response timeout occurring in the controller, due to no reconfiguration authentication response received,
   wherein each of the enrollee agent and the controller operates in at least two wireless bands, and
   wherein the enrollee agent is configured with at least two communication interfaces each with a different medium access control (MAC) address corresponding to a respective one of the at least two wireless bands,
   wherein the apparatus is implemented in the controller,
   wherein the performing of the reconfiguration process comprises the controller performing the reconfiguration process with a timer with an increased duration used for the reconfiguration authentication response timeout in the controller to prevent connection timeout occurring, and
   wherein the duration used for the reconfiguration authentication response timeout is increased to an amount equal to a maximum number of channels on each band of the at least two wireless bands multiplied by a waiting time on each channel of at least two channels corresponding to the at least two wireless bands.

2. An apparatus, comprising:
   a transceiver configured to communicate wirelessly; and
   a processor coupled to the transceiver and configured to, via the transceiver, perform a reconfiguration process between an enrollee agent and a controller of a Device Provisioning Protocol (DPP) network without a reconfiguration authentication response timeout occurring in the controller, due to no reconfiguration authentication response received,
   wherein each of the enrollee agent and the controller operates in at least two wireless bands, and
   wherein the enrollee agent is configured with at least two communication interfaces each with a different medium access control (MAC) address corresponding to a respective one of the at least two wireless bands,
   wherein the apparatus is implemented in the controller,
   wherein the performing of the reconfiguration process comprises the controller performing the reconfiguration process with a timer with an increased duration used for the reconfiguration authentication response timeout in the controller to prevent connection timeout occurring, and
   wherein the duration used for the reconfiguration authentication response timeout is increased to an amount equal to a maximum number of channels on each band of the at least two wireless bands multiplied by a waiting time on each channel of at least two channels corresponding to the at least two wireless bands.

* * * * *